US011171692B2

(12) United States Patent
Yun et al.

(10) Patent No.: US 11,171,692 B2
(45) Date of Patent: Nov. 9, 2021

(54) SIGNAL TRANSMISSION/RECEPTION METHOD IN WIRELESS LAN SYSTEM, AND DEVICE THEREFOR

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/464,252

(22) PCT Filed: Feb. 11, 2019

(86) PCT No.: PCT/KR2019/001607
§ 371 (c)(1),
(2) Date: May 24, 2019

(87) PCT Pub. No.: WO2019/156513
PCT Pub. Date: Aug. 15, 2019

(65) Prior Publication Data
US 2019/0273535 A1 Sep. 5, 2019

Related U.S. Application Data

(60) Provisional application No. 62/628,292, filed on Feb. 9, 2018, provisional application No. 62/634,930, filed on Feb. 26, 2018.

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0456* (2013.01); *H04B 7/0617* (2013.01);
(Continued)

(58) Field of Classification Search
CPC .. H04B 7/0417; H04B 7/0456; H04B 7/0617; H04L 5/0046; H04W 72/0446; H04W 72/046; H04W 84/12
(Continued)

(56) References Cited

U.S. PATENT DOCUMENTS

2011/0158348 A1* 6/2011 Ponnampalam .... H04L 27/2627
375/298
2014/0093005 A1 4/2014 Xia et al.
(Continued)

OTHER PUBLICATIONS

IEEE 802.11—18/0192r1, Hybrid Beamforming Feedback in 802.11ay, Jan. 8, 2018 See slides 8-9 (Year: 2018).*
(Continued)

*Primary Examiner* — Yemane Mesfin
*Assistant Examiner* — Intekhaab A Siddiquee
(74) *Attorney, Agent, or Firm* — Lee, Hong, Degerman, Kang & Waimey

(57) ABSTRACT

Provided are a method and apparatus for transmitting a feedback frame by performing multi input multi output (MIMO) beamforming procedure in a wireless local area network (WLAN) system. Specifically, a first station (STA) generates the feedback frame based on the MIMO beamforming procedure. The first STA transmits the feedback frame to a second STA. The feedback frame includes a feedback subcarrier for a predetermined frequency band. A first subcarrier transmitted first in the feedback subcarrier and a second subcarrier having subcarrier indices −2 and 2 are statically transmitted. The first subcarrier is configured as a left edge subcarrier or right edge subcarrier of the predetermined frequency band. A subcarrier index of a third
(Continued)

subcarrier included in the feedback subcarrier is determined based on a grouping value which is a subcarrier interval. The third subcarrier is a subcarrier excluding the first subcarrier and the second subcarrier from the feedback subcarrier. The grouping value is dynamically changed based on channel state information.

15 Claims, 19 Drawing Sheets

(51) Int. Cl.
    *H04L 25/02*     (2006.01)
    *H04W 72/04*     (2009.01)
    *H04B 7/0456*     (2017.01)
    *H04L 5/00*     (2006.01)
    *H04W 84/12*     (2009.01)

(52) U.S. Cl.
    CPC ......... *H04B 7/0634* (2013.01); *H04L 5/0046* (2013.01); *H04L 25/0204* (2013.01); *H04W 72/046* (2013.01); *H04W 72/0446* (2013.01); *H04W 84/12* (2013.01)

(58) Field of Classification Search
    USPC ........................................................ 370/329
    See application file for complete search history.

(56) References Cited

U.S. PATENT DOCUMENTS

| | | | |
|---|---|---|---|
| 2016/0204960 A1 | 7/2016 | Yu | |
| 2016/0330047 A1* | 11/2016 | Seok | ............... H04L 5/0057 |
| 2016/0380729 A1* | 12/2016 | Porat | ............... H04B 7/0408 |
| | | | 370/329 |
| 2017/0033898 A1 | 2/2017 | Chun et al. | |
| 2017/0070274 A1 | 3/2017 | Lim et al. | |
| 2017/0070995 A1* | 3/2017 | Eitan | ............... H04W 72/0453 |
| 2017/0111148 A1 | 4/2017 | Park et al. | |
| 2017/0171860 A1* | 6/2017 | Park | ............... H04W 72/0453 |

OTHER PUBLICATIONS

IEEE 802.11—18/0175r1, MU Beamforming for mmWave Distributed Network, Jan. 10, 2018 See slides 5-7 (Year: 2018).*
PCT International Application No. PCT/KR2019/001607, International Search Report dated May 21, 2019, 3 pages.
European Patent Office Application Serial No. 19721967.8, Search Report dated Oct. 7, 2019, 9 pages.
European Patent Office Application Serial No. 19721967.8, Office Action dated Mar. 24, 2020, 7 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 16

| Nc Index | Nr Index | Tx Antenna Mask | Ncb | Grouping | Codebook Information | Feedback Type | Number of Feedback Matrices or Feedback Taps |
|---|---|---|---|---|---|---|---|
| 3 | 3 | 8 | 2 | 2 | 1 | 1 | 10 |

Bits:

SIGNAL TRANSMISSION/RECEPTION METHOD IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2019/001607, filed on Feb. 11, 2019, which claims the benefit of U.S. Provisional Application Nos. 62/628,292, filed on Feb. 9, 2018, and 62/634,930, filed on Feb. 26, 2018, the contents of which are hereby incorporated by reference herein in their entirety.

BACKGROUND OF THE INVENTION

Field of the Invention

The present specification relates to a technique for transmitting/receiving a signal in a wireless local area network (LAN) system, and more particularly, to a method and apparatus for transmitting a feedback frame by performing multi input multi output (MIMO) beamforming.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present specification proposes a method and apparatus for transmitting a feedback frame by performing multi input multi output (MIMO) beamforming in a wireless local area network (WLAN) system.

The present specification propose a method and apparatus for transmitting a feedback frame to perform MIMO beamforming.

The present embodiment proposes a method in which a feedback carrier is configured with a subcarrier interval corresponding to a grouping value instead of feeding back all subcarriers in a compressed beamforming feedback process during a hybrid beamforming procedure. However, the present embodiment proposes a method in which the grouping value is not fixed but flexibly changed according to a channel situation to dynamically transmit a feedback subcarrier.

First, summarizing terminologies, a first station (STA) may correspond to a responder for performing MIMO beamforming, and a second STA may correspond to an initiator for performing MIMO beamforming. The MIMO beamforming described in the present embodiment may correspond to single user (SU)-MIMO beamforming if the first STA is a single device, and may correspond to multi user (MU)-MIMO beamforming if the first STA is a plurality of devices.

The first STA generates a feedback frame based on a MIMO beamforming procedure. The MIMO beamforming procedure may include a sounding procedure for transmitting/receiving a BRP (Beam Refinement Protocol or Beam Refinement Phase) packet (or frame).

The feedback frame is transmitted to the second STA.

The feedback frame may be defined as follows.

The feedback frame includes a feedback subcarrier for a predetermined frequency band.

A first subcarrier transmitted first in the feedback subcarrier and a second subcarrier having subcarrier indices −2 and 2 are statically transmitted. The first subcarrier is configured as a left edge subcarrier or right edge subcarrier of the predetermined frequency band.

A subcarrier index of a third subcarrier included in the feedback subcarrier is determined based on a grouping value which is a subcarrier interval. The third subcarrier is a subcarrier excluding the first subcarrier and the second subcarrier from the feedback subcarrier. The grouping value is dynamically changed based on channel state information.

That is, since the grouping value is dynamically changed according to a channel state, the third subcarrier included in the feedback subcarrier may be dynamically transmitted instead of being transmitted at a static position. However, the first subcarrier and second subcarrier included in the feedback subcarrier may always be transmitted statically.

The grouping value may be an interval between subcarriers contiguous to the third subcarrier. The grouping value may be determined as one of values 2, 4, and 8. The grouping value may be indicated with 2 bits.

The third subcarrier may be determined as a subcarrier spaced apart by the grouping value or 1 sequentially from the first subcarrier.

For example, it is assumed that a subcarrier index of the first subcarrier is −177. A subcarrier transmitted secondly in the feedback subcarrier may be spaced apart by 1 from the first subcarrier, and thus a subcarrier index thereof may be −176. A subcarrier transmitted thirdly in the feedback subcarrier may be spaced apart by the grouping value (assuming that Ng=4) from the subcarrier transmitted secondly, and thus a subcarrier index thereof may be −172. That is, the grouping value (assuming that Ng=4) may indicate an interval between the subcarrier transmitted secondly and the subcarrier (adjacent subcarrier) transmitted thirdly. The grouping value is indicated with 2 bits (The grouping value includes information on 2 bits), and may be indicated such as Ng=2 if 01, Ng=4 if 10, and Ng=8 if 11.

The predetermined frequency band may be determined according to channel bonding supported in 802.11ay.

For example, if the predetermined frequency band corresponds to (is related with) a single channel, a subcarrier index of the left edge subcarrier may be −177, and a subcarrier index of the right edge subcarrier may be 177.

For another example, if the predetermined frequency band corresponds to (is related with) two bonded channels, the subcarrier index of the left edge subcarrier may be −386, and the subcarrier index of the right edge subcarrier may be 386.

For another example, if the predetermined frequency band corresponds to (is related with) three bonded channels, the subcarrier index of the left edge subcarrier may be −596, and the subcarrier index of the right edge subcarrier may be 596.

For another example, if the predetermined frequency band corresponds to (is related with) four bonded channels, the subcarrier index of the left edge subcarrier may be −805, and the subcarrier index of the right edge subcarrier may be 805.

The channel state information may be transmitted through the feedback subcarrier.

A fourth subcarrier having subcarrier indices −1, 0, and 1 may not be transmitted in the feedback subcarrier. The fourth subcarrier may be a DC subcarrier. Transmitting of the second subcarrier having the subcarrier indices −2 and 2 may be a limitation for not feeding back the DC subcarrier.

In an embodiment proposed in the present specification, a feedback subcarrier can be flexibly fed back according to a channel situation by dynamically changing a grouping value indicating an interval between feedback subcarriers.

In addition, since an edge subcarrier and a subcarrier contiguous to a DC subcarrier are statically transmitted, channel state information can be effectively fed back in a beamforming process by always including a subcarrier necessary for feedback performance.

BRIEF DESCRIPTION OF THE DRAWINGS

FIG. 9 is a diagram showing a PPDU structure that can be applied to the present invention.

FIG. 16 shows a digital Fbck control field according to an embodiment of the present specification.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
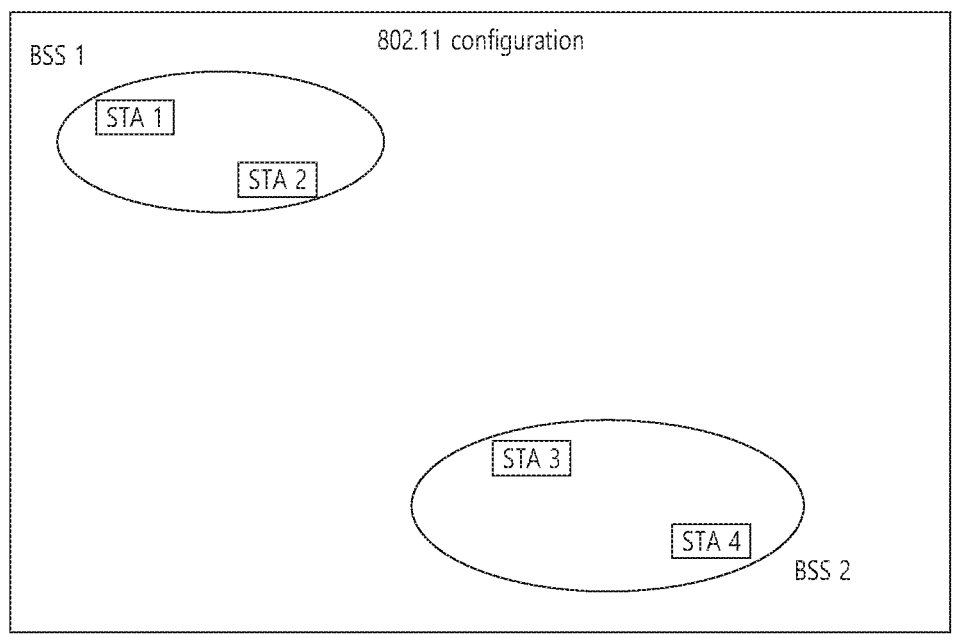
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
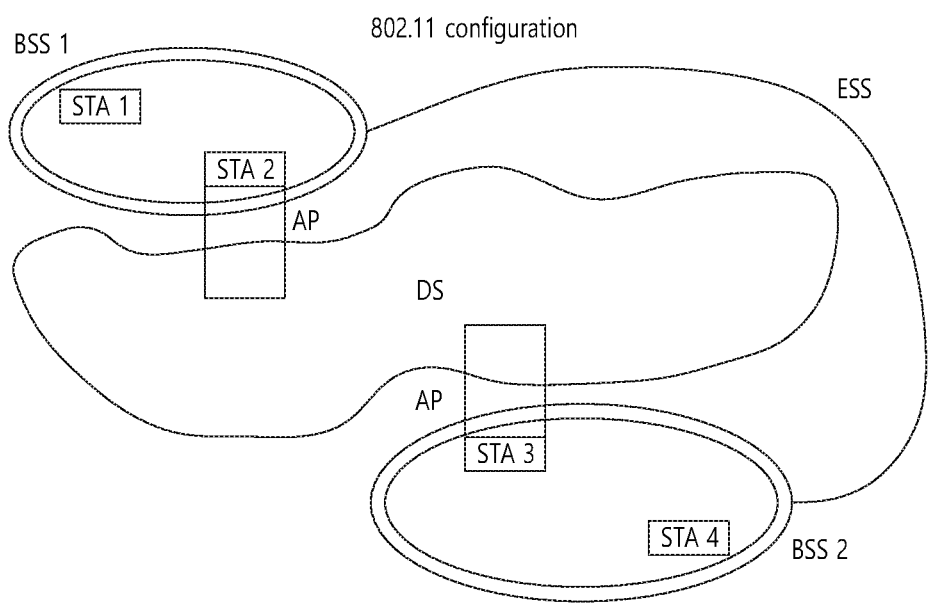
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2 Channel Bonding in a Wireless LAN (WLAN) System

Figure 3:
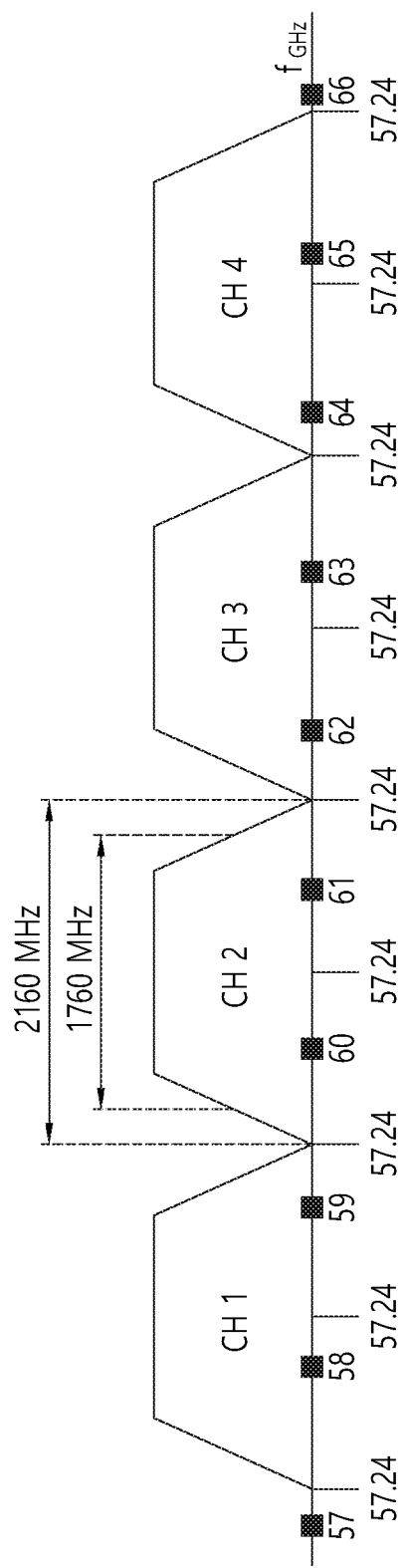
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz-66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
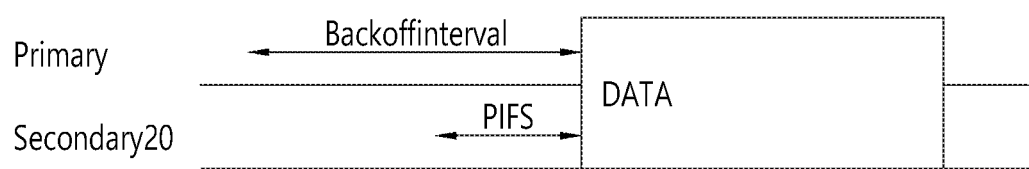
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
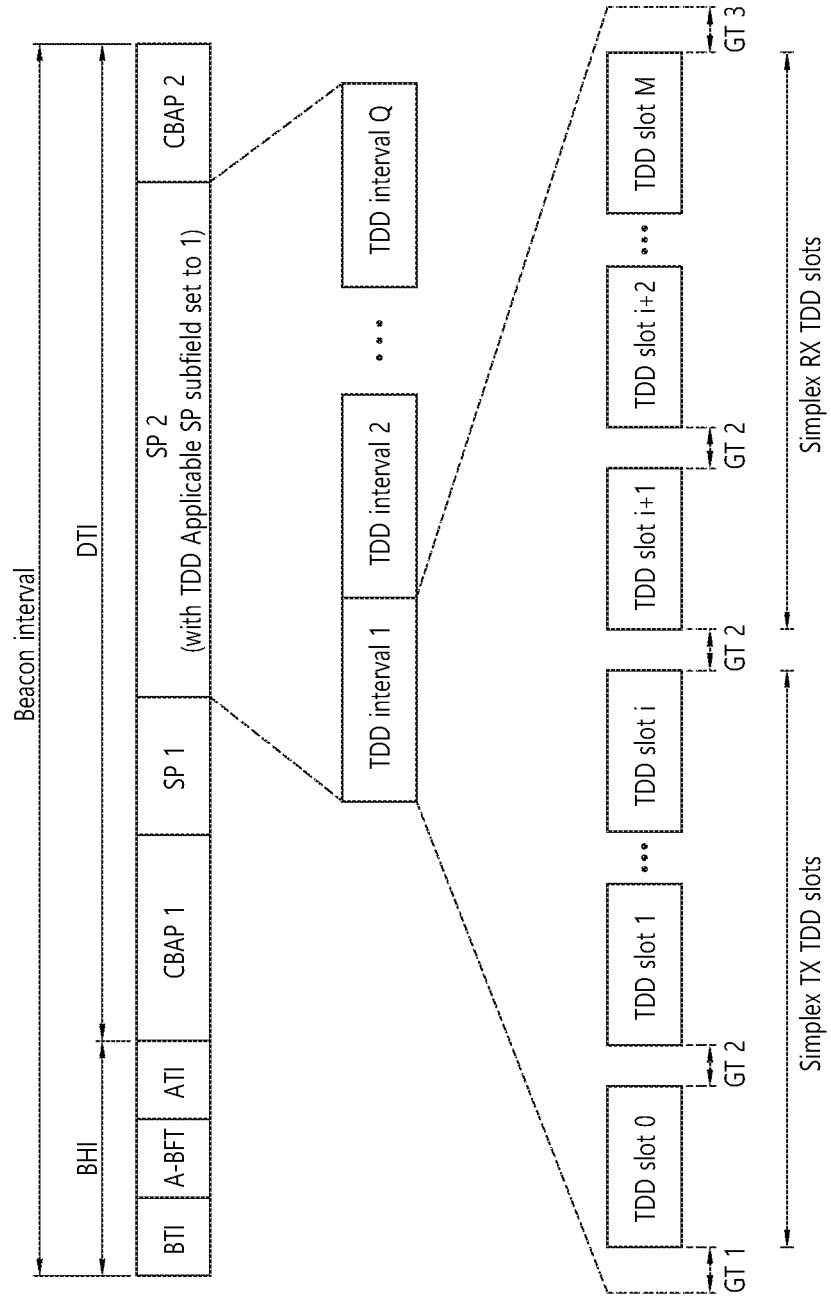
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

FIG. 5 shows a structure of a TDD service period (SP). The TDD SP consists of one or more consecutive and adjacent TDD intervals (TDD interval 1, TDD interval 2, . . . , TDD interval Q) actualized by a TDD slot structure element. The TDD interval includes one or more TDD slots. Adjacent TDD slots shown in FIG. 5 shall be separated temporally by a guard time (GT) defined by the TDD slot structure element (according to FIG. 5, the slots are separated temporally by GT1, GT2, GT3). If all STA operations are identical, transmission and reception of the adjacent TDD slots allocated to the same STA pair may be continued between the adjacent TDD slots.

An STA which intends to transmit data through a beamforming operation is referred to as an initiator, and an STA which receives data transmitted from the initiator is referred to as a responder. According to FIG. 5, the initiator may transmit data (or a frame) to the responder in a TX TDD slot (TDD slot 0, TDD slot 1, . . . , TDD slot i), and the responder may receive data (or a frame) from the initiator in an RX TDD slot (TDD slot i+1, TDD slot i+2, . . . , TDD slot M).

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
| --- | --- | --- |
| Control PHY | 0 | |
| Single carrier PHY (SC PHY) | 1 . . . 12 25 . . . 31 | (low power SC PHY) |
| OFDM PHY | 13 . . . 24 | |

Figure 6:
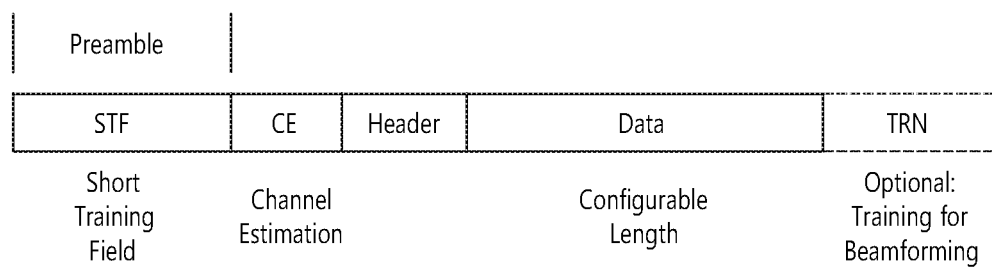
FIG. 6 is a diagram describing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
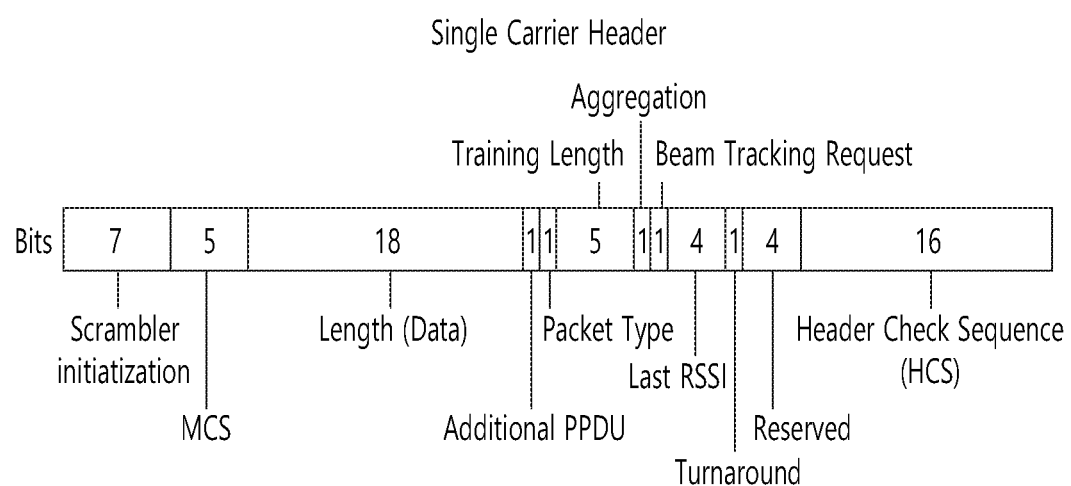
FIG. 7 and FIG. 8 are diagrams describing a configuration of a header field of the radio frame shown in FIG. 6.
Figure 8:
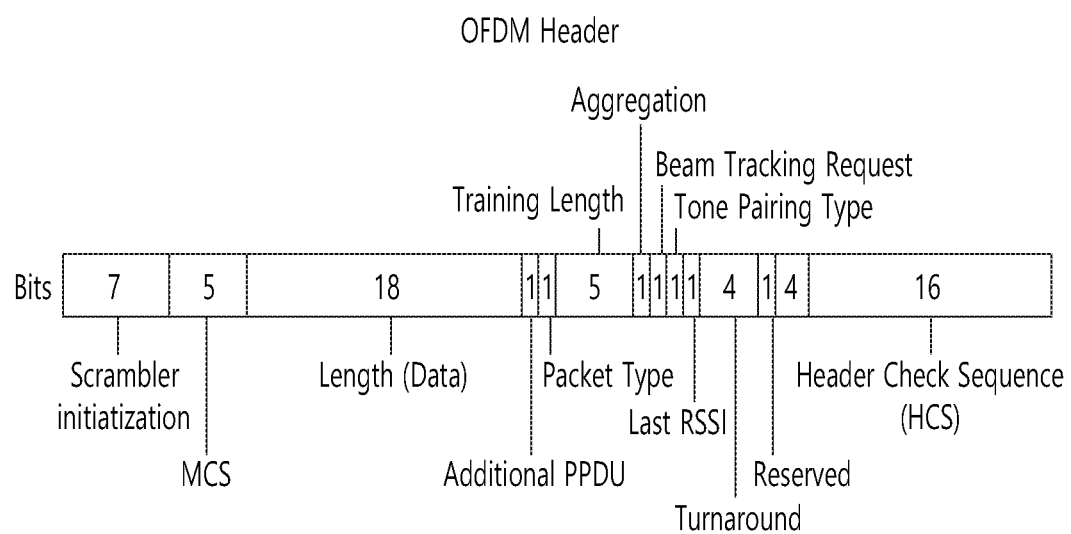

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. The header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
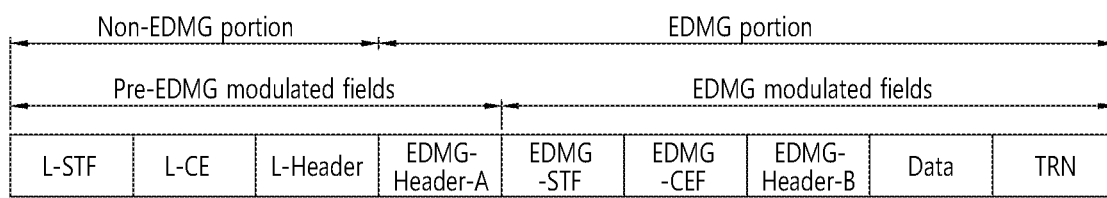
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble may be the part of the PPDU that is used for packet detection, automatic gain control (AGC), frequency offset estimation, synchronization, indication of modulation (SC or OFDM) and channel estimation. The format of the preamble may be common to both OFDM packets and SC packets. In this case, the preamble may be composed of a short training field (STF) and a channel estimation (CE) located after the STF.

2. Beamforming Procedure that is Applicable to the Present Invention

As described above, methods such as channel bonding, channel aggregation, FDMA, and so on, which transmit data by using multiple channels at the same time may be applied in the 11ay system that can apply the present invention. Most particularly, since the 11ay system that can apply the present invention uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present invention proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

2.1. Performing Beamforming for Only One Channel

Figure 11:
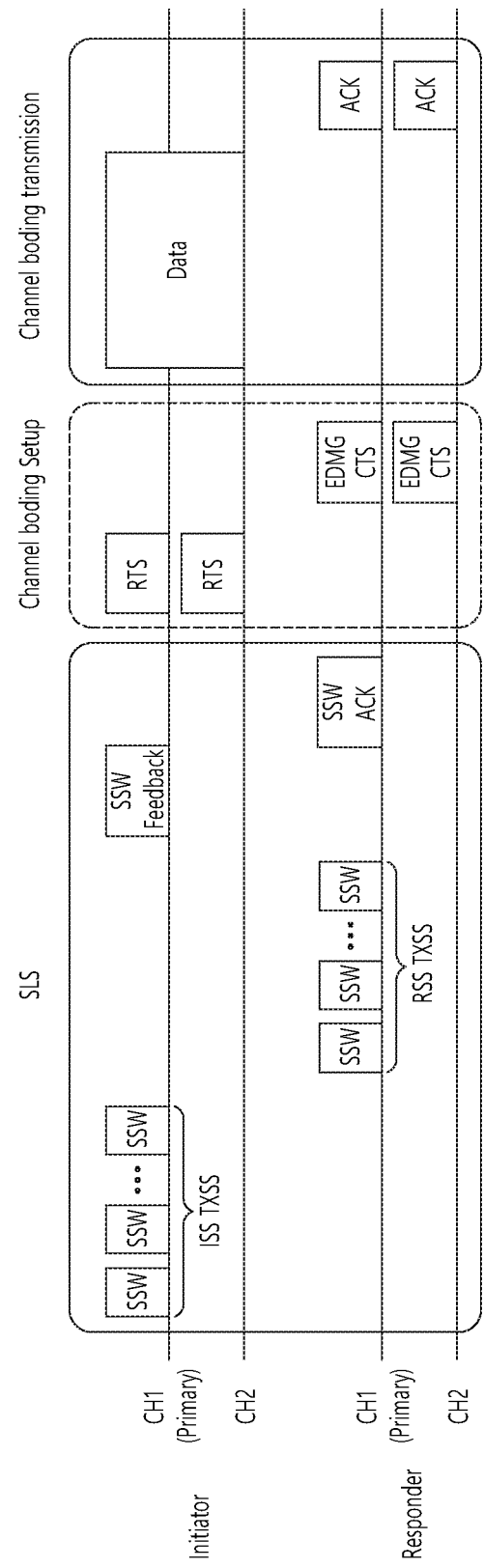
FIG. 11 is a diagram showing an operation for performing beamforming on one channel according to an exemplary embodiment of the present invention.

FIG. 11 is a diagram showing an operation for performing beamforming on one channel according to an exemplary embodiment of the present invention. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present invention may also be extendedly applied to channel bonding, channel aggregation, and so on, through 3 or more channels.

As shown in FIG. 11, the beamforming procedure according to an exemplary embodiment of the present invention may be configured of a sector level sweep (SLS) phase, a channel bonding setup phase, and a channel bonding transmission phase. Hereinafter, the characteristics of each phase will be described in detail.

2.1.1. SLS Phase

In a 60 GHz band supporting the 11ay system, which can apply the present invention, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
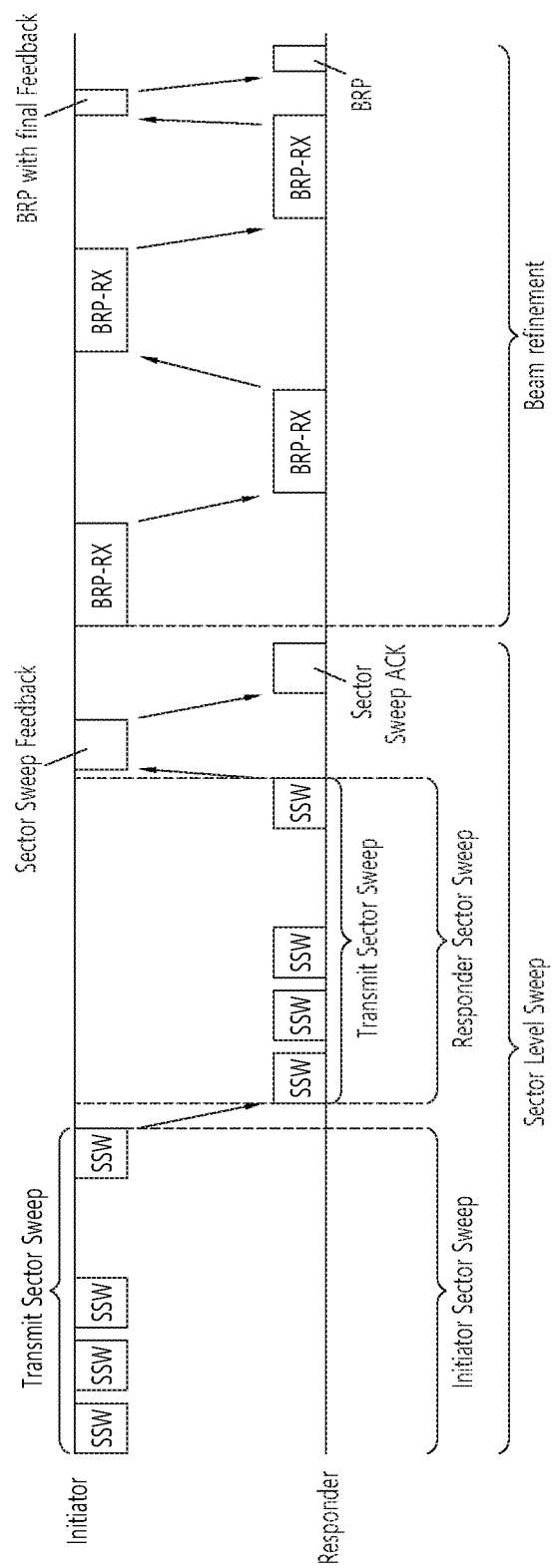
FIG. 12 shows an example of a beamforming training procedure that can be applied to the present invention.

FIG. 12 shows an example of a beamforming training procedure that can be applied to the present invention.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
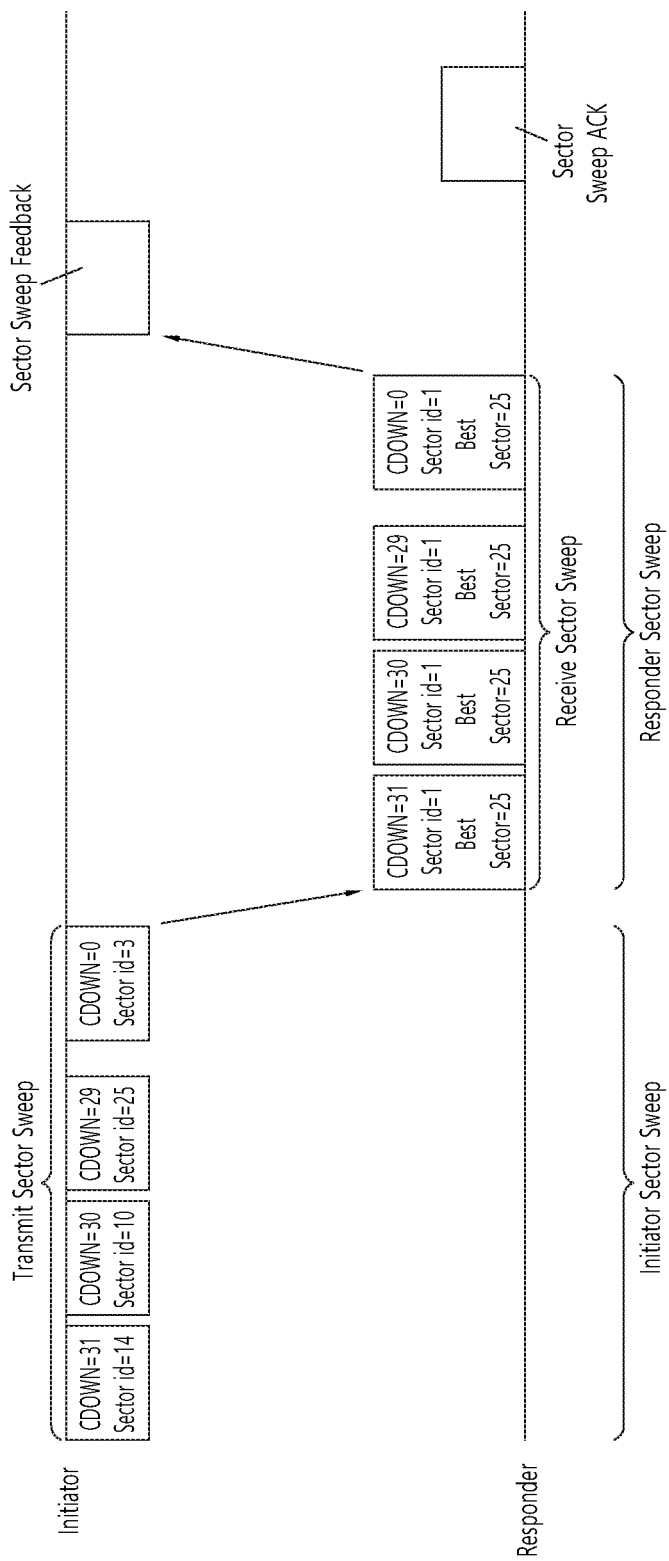
FIG. 13 and FIG. 14 is a diagram showing examples of a Sector Level Sweep (SLS) phase.
Figure 14:
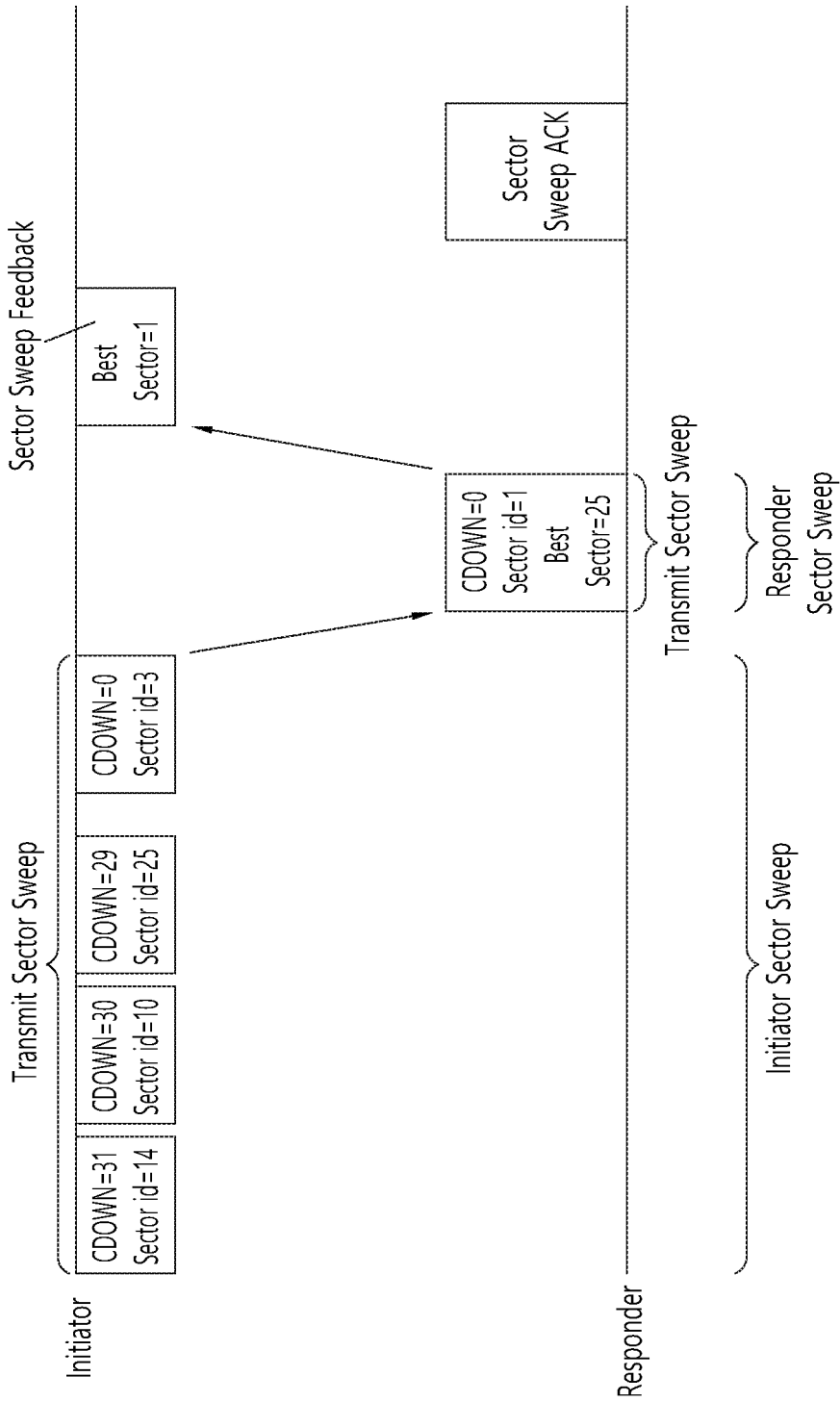

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11ay system that can apply the present invention, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

2.1.2 Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

2.1.3 Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

At this point, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3. Embodiment Applicable to the Present Invention

During a hybrid beamforming procedure, a compressed beamforming feedback process feeds back subcarriers by determining grouping (Ng=2, 4, 8) instead of feeding back all subcarriers. In IEEE 802.11ay, a dynamic grouping technique is also proposed in addition to the feedback performed by determining a group value. Dynamic grouping is a scheme in which the feedback is performed by flexibly changing a subcarrier grouping value according to a channel situation without having to perform the feedback with an interval of Ng when performing the feedback. A technique for a tone index is proposed when the dynamic grouping is performed in this manner.

Hereinafter, hybrid beamforming will be described.

An EDMG STA is capable of hybrid beamforming. Specifically, the hybrid beamforming is possible when one (or both) of a hybrid beamforming and SU-MIMO supported subfield included in an EDMG capabilities element of the STA and a hybrid beamforming and MU-MIMO supported subfield included in the EDMG capabilities element of the STA is 1.

Alternatively, when the hybrid beamforming and SU-MIMO supported subfield is 1 in the EDMG capability element of the STA, the STA capable of hybrid beamforming is capable of hybrid beamforming and SU-MIMO. The STA capable of hybrid beamforming may be capable of hybrid beamforming and MU-MIMO when the hybrid beamforming and MU-MIMO supported subfield of the hybrid beamforming and the EDMG capability element of the STA is 1.

The STA capable of hybrid beamforming supports a hybrid beamforming protocol

The hybrid beamforming represents transmission/reception of multi-spatial streams which use a combination of analog beamforming (by determining proper AWB) and digital beamforming (by determining a proper spatial mapping matrix) between an initiator capable of SU-MIMO and a responder capable of SU-MIMO or between an initiator capable of MU-MIMO and at least one responder capable of MU-MIMO. The spatial mapping matrix is determined based on a DMG antenna structure selected as a result of an SU-MIMO or MU-MIMO beamforming protocol The hybrid beamforming protocol supports digital baseband training and hybrid beamforming information feedback for next hybrid beamforming transmission.

The hybrid beamforming may be used to support transmission of a single spatial stream which uses multi-DMG antennas together with a combination of analog beamforming and digital beamforming between an initiator capable of SU-MIMO and a responder capable of SU-MIMO.

AWV of a DMG antenna may be selected by using an SU-MIMO beamforming protocol or an MU-MIMO beamforming protocol, which enables to determine an antenna structure for simultaneous transmission of a single or multi-spatial stream from the initiator to the responder(s) (the other way around is also possible in case of SU-MIMO).

In the hybrid beamforming protocol, a transmitting device acquires hybrid beamforming information based on a feedback from a receiving device, induced from a channel direction between the transmitting device and the receiving device.

Figure 15:
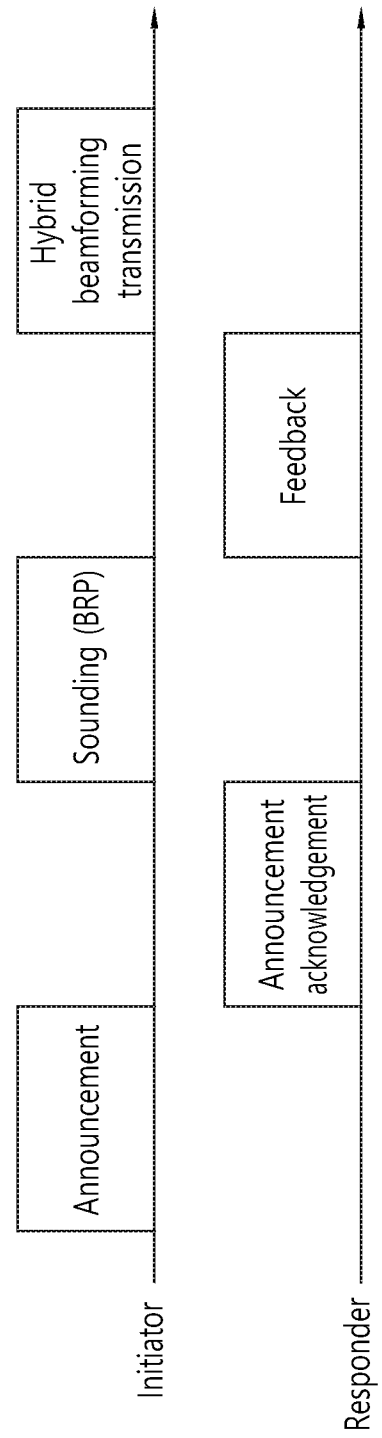
FIG. 15 shows an SU-MIMO hybrid beamforming procedure according to an embodiment of the present specification.

FIG. 15 shows an SU-MIMO hybrid beamforming procedure according to an embodiment of the present specification.

Referring to FIG. 15, hybrid beamforming includes an announcement phase, a sounding phase, and a feedback phase. The announcement phase may be skipped when a beamforming configuration is predetermined.

A MIMO feedback control element proposed in the present embodiment is used to transfer configuration information for a channel measurement feedback element, an EDMG channel measurement feedback element, and/or a digital beamforming feedback element. The MIMO feedback control element includes a digital Fbck control field.

FIG. 16 shows a digital Fbck control field according to an embodiment of the present specification.

Referring to FIG. 16, the digital Fbck control field includes subfields of Nc Index, Nr Index, Tx Antenna Maxk, Ncb, Grouping, Codebook Information, Feedback Type, Number of Feedback Matrices or Feedback Taps. Each subframe included in the digital Fbck control field is described in the following table.

TABLE 2

| Subfield | Meaning |
|---|---|
| Nc Index | Indicates the number of columns, Nc, in the beamforming feedback matrix minus one:<br>Set to 0 for Nc = 1<br>Set to 1 for Nc = 2<br>Set to 2 for Nc = 3<br>Set to 3 for Nc = 4<br>Set to 4 for Nc = 5<br>Set to 5 for Nc = 6<br>Set to 6 for Nc = 7<br>Set to 7 for Nc = 8 |
| Nr Index | Indicates the number of rows, Nr, in a beamforming feedback matrix minus one:<br>Set to 0 for Nr = 1<br>Set to 1 for Nr = 2<br>Set to 2 for Nr = 3<br>Set to 3 for Nr = 4<br>Set to 4 for Nr = 5<br>Set to 5 for Nr = 6<br>Set to 6 for Nr = 7<br>Set to 7 for Nr = 8 |
| Tx Antenna Mask | Indicates the Tx Antennas reported in the accompanying Digital BF Feedback element. If the CSI for the $i^{th}$ Tx Antenna is included in the accompanying Digital BF feedback element, the $i^{th}$ bit in Tx Antenna Mask is set to 1. Otherwise, the $i^{th}$ bit in Tx Antenna Mask is set to 0. |
| Ncb | Indicates the number of contiguous 2.16 GHz channels the measurement was made for minus one:<br>Set to 0 for 2.16 GHz<br>Set to 1 for 4.32 GHz<br>Set to 2 for 6.48 GHz<br>Set to 3 for 8.64 GHz |

TABLE 2-continued

| Subfield | Meaning |
| --- | --- |
| Grouping | Indicates the subcarrier grouping, Ng, used for beamforming feedback matrix<br>Set to 0 for $N_g = 2$<br>Set to 1 for $N_g = 4$<br>Set to 2 for $N_g = 8$<br>Set to 3 for dynamic grouping; reserved if dynamic grouping is not supported<br>If the Feedback Type subfield is 0, the Grouping subfield is reserved. |
| Codebook Information | Indicates the size of codebook entries.<br>If the SU/MU field in the MIMO Feedback Control element is 1:<br>   Set to 0 for 6 bits for $\Psi$, 4 bits for $\phi$<br>   Value 1 is reserved<br>If the SU/MU field in the MIMO Feedback Control element is 0:<br>   Set to 0 for 9 bits for $\Psi$, 7 bits for $\phi$<br>   Value 1 is reserved |
| Feedback Type | Indicates which type of feedback is provided. Set to 0 for uncompressed beamforming feedback in time domain (EDMG SC mode) and set to 1 for compressed using Givens-Rotation in frequency domain (EDMG OFDM mode). |
| Number of Feedback Matrices or Feedback Taps | This field is represented by the variable $N_{SC}$.<br>If the Feedback Type subfield is 0, $N_{SC}$ is the number of feedback taps per element of the SC feedback matrix.<br>If the Feedback Type subfield is 1 and the Grouping subfield is less than 3, $N_{SC}$ is determined by Table 29.<br>If the Feedback Type subfield is 1 and the Grouping subfield is 3, $N_{SC}$ specifies the number of subcarriers present in the Digital Beamforming Feedback Information field of the Digital BF Feedback element minus one. |

A digital beamforming (BF) feedback element is transmitted in a MIMO BF feedback frame, and transfers feedback information in a form of a beamforming feedback matrix and differential SNRs. The feedback information may be used by a transmission beam-former to determine a digital BF adjustment matrix Q. When the digital BF feedback element is transmitted in the MIMO BF feedback frame, an SNR field in a channel measurement feedback element is interpreted as a per-stream average SNR.

A size and configuration of the digital BF feedback element differ depending on a field value included in the MIMO feedback control element transmitted in the same frame which transmits the digital BF feedback element. Accordingly, a reference of all fields existing in the MIMO feedback control element represents an element transmitted in the same frame which transfers the digital BF feedback element.

When a feedback type subfield in the digital Fbck control field is 0, a digital BF feedback information field of the digital BF feedback element includes Nsc digital beamforming matrices. When Nsc>1, a tap delay field indicating a tap corresponding to each digital beamforming matrix is additionally present. Digital beamforming information in a time domain may be represented by a matrix function V.

The digital BF feedback element may be defined by the following table.

TABLE 3

| Field | | Size | Meaning |
| --- | --- | --- | --- |
| Element ID | | 8 bits | |
| Length | | 8 bits | |
| Element ID Extension | | 8 bits | |
| Digital Beamforming Feedback Information | Digital Beamforming Feedback Matrix 1 | $n_{bit}$ bits | If Feedback Type subfield is 0, represents the beamforming matrix in time domain for the $1^{st}$ tap as described above.<br>If Feedback Type subfield is 1, represents the beamforming matrix for the $1^{st}$ subcarrier, indexed by matrix angles in the order shown in Table 27 |
| | . . . | . . . | |
| | Digital Beamforming Feedback Matrix $N_{SC}$ | $n_{bit}$ bits | If Feedback Type subfield is 0, represents the beamforming matrix in time domain for the $N_{SC}^{th}$ tap as described above.<br>If Feedback Type subfield is 1, represents the beamforming matrix for the $N_{SC}^{th}$ subcarrier, indexed by matrix angles in the order shown in Table 27 |
| Differential Subcarrier Index | | Differential subcarrier index scidx(0) – scidx(1) | 3 bits | When Grouping subfield is 3, this field represents the number of subcarriers between scidx(0) and scidx(1). Otherwise, it is not present.<br>It is set to j to indicate the distance between the scidx(0) and scidx(1) is $2^j$<br>Set to 0 to indicate 1<br>Set to 1 to indicate 2<br>Set to 2 to indicate 4<br>Set to 3 to indicate 8<br>Set to 4 to indicate 16<br>Set to 5 to indicate 32<br>Values 6 and 7 are reserved. |
| | . . . | . . . | |

TABLE 3-continued

| Field | Size | Meaning |
|---|---|---|
| Differential subcarrier index $scidx(N_{SC} - 1) - scidx(N_{SC})$ | 3 bits | When Grouping subfield is 3, this field represents the number of subcarriers between $scidx(N_{SC} - 1)$ and $scidx(N_{SC})$. Otherwise it is not present. It is set to j to indicate the distance between the $scidx(N_{SC} - 1)$ and $scidx(N_{SC})$ is $2^j$ |

According to Table 3 above, a differential subcarrier index is only present when Ng is set to a value indicating dynamic subcarrier grouping. When dynamic grouping is used, a distance between any adjacent subcarriers, which are not edge subcarriers or DC subcarriers, is one of values indicated within the grouping field.

When the grouping subfield within the digital Fbck control field is less than or equal to 2, the subcarrier indices for which the beamforming matrices are computed are defined in Table 4. When the grouping subfield within the digital Fbck control field is 3, the digital BF feedback element includes the differential subcarrier index field marking the number of subcarriers between each two adjacent subcarriers within the feedback report. The subcarrier index set is constructed such that it is a subset of the subcarrier index set defined for Ng=2 and the corresponding $N_{CB}$ in Table 4, such that the edge subcarriers and the subcarriers with indices −2 and 2 are present within the feedback report and the distance between subcarriers within the feedback report is one of the values in {1, 2, 4, 8, 16, 32}.

TABLE 4

| NCB | Ng | Ns | Subcarriers for which Compressed Feedback Beamforming Matrix subfield is sent: scidx(0), scidx(1), . . . , scidx(Ns − 1) Note: DC subcarriers (0, ±1) are skipped. |
|---|---|---|---|
| 1 | 2 | 178 | −177, −176, −174, −172, −170, −168, −166, −164, −162, −160, −158, −156, −154, −152, −150, −148, −146, −144, −142, −140, −138, −136, −134, −132, −130, −128, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 177 |
| 2 | 2 | 388 | −386, −385, −383, −381, −379, −377, −375, −373, −371, −369, −367, −365, −363, −361, −359, −357, −355, −353, −351, −349, −347, −345, −343, −341, −339, −337, −335, −333, −331, −329, −327, −325, −323, −321, −319, −317, −315, −313, −311, −309, −307, −305, −303, −301, −299, −297, −295, −293, −291, −289, −287, −285, −283, −281, −279, −277, −275, −273, −271, −269, −267, −265, −263, −261, −259, −257, −255, −253, −251, −249, −247, −245, −243, −241, −239, −237, −235, −233, −231, −229, −227, −225, −223, −221, −219, −217, −215, −213, −211, −209, −207, −205, −203, −201, −199, −197, −195, −193, −191, −189, −187, −185, −183, −181, −179, −177, −176, −174, −172, −170, −168, −166, −164, −162, −160, −158, −156, −154, −152, −150, −148, −146, −144, −142, −140, −138, −136, −134, −132, −130, −128, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 177, 179, 181, 183, 185, 187, 189, 191, 193, 195, 197, 199, 201, 203, 205, 207, 209, 211, 213, 215, 217, 219, 221, 223, 225, 227, 229, 231, 233, 235, 237, 239, 241, 243, 245, 247, 249, 251, 253, 255, 257, 259, 261, 263, 265, 267, 269, 271, 273, 275, 277, 279, 281, 283, 285, 287, 289, 291, 293, 295, 297, 299, 301, 303, 305, 307, 309, 311, 313, 315, 317, 319, 321, 323, 325, 327, 329, 331, 333, 335, 337, 339, 341, 343, 345, 347, 349, 351, 353, 355, 357, 359, 361, 363, 365, 367, 369, 371, 373, 375, 377, 379, 381, 383, 385, 386 |
| 3 | 2 | 598 | −596, −594, −592, −590, −588, −586, −584, −582, −580, −578, −576, −574, −572, −570, −568, −566, −564, −562, −560, −558, −556, −554, −552, −550, −548, −546, −544, −542, −540, −538, −536, −534, −532, −530, −528, −526, −524, −522, −520, −518, −516, −514, −512, −510, −508, −506, −504, −502, −500, −498, −496, −494, −492, −490, −488, −486, −484, −482, −480, −478, −476, −474, −472, −470, −468, −466, −464, −462, −460, −458, −456, −454, −452, −450, −448, −446, −444, −442, −440, −438, −436, −434, −432, −430, −428, −426, −424, −422, −420, −418, −416, −414, −412, −410, −408, −406, −404, −402, −400, −398, −396, −394, −392, −390, −388, −386, −385, −383, −381, −379, −377, −375, −373, −371, −369, −367, −365, −363, −361, −359, −357, −355, −353, −351, −349, −347, −345, −343, −341, −339, −337, −335, −333, −331, −329, −327, −325, −323, −321, −319, −317, −315, −313, −311, −309, −307, −305, −303, −301, −299, −297, −295, −293, −291, −289, −287, −285, −283, −281, −279, −277, −275, −273, −271, −269, −267, −265, −263, −261, −259, −257, −255, −253, −251, −249, −247, −245, −243, −241, −239, −237, −235, −233, −231, −229, −227, −225, −223, −221, −219, −217, −215, −213, −211, −209, −207, −205, −203, −201, −199, −197, −195, −193, −191, −189, −187, −185, −183, −181, −179, −177, −176, −174, −172, −170, −168, −166, −164, −162, −160, −158, −156, −154, −152, −150, −148, −146, −144, −142, −140, −138, −136, −134, −132, −130, −128, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, |

TABLE 4-continued

| NCB | Ng | Ns | Subcarriers for which Compressed Feedback Beamforming Matrix subfield is sent: scidx(0), scidx(1), ... , scidx(Ns − 1)<br>Note: DC subcarriers (0, ±1) are skipped. |
|---|---|---|---|
| | | | 120, 122, 124, 126, 128, 130, 132, 134, 136, 138, 140, 142, 144, 146, 148, 150, 152, 154, 156, 158, 160, 162, 164, 166, 168, 170, 172, 174, 176, 177, 179, 181, 183, 185, 187, 189, 191, 193, 195, 197, 199, 201, 203, 205, 207, 209, 211, 213, 215, 217, 219, 221, 223, 225, 227, 229, 231, 233, 235, 237, 239, 241, 243, 245, 247, 249, 251, 253, 255, 257, 259, 261, 263, 265, 267, 269, 271, 273, 275, 277, 279, 281, 283, 285, 287, 289, 291, 293, 295, 297, 299, 301, 303, 305, 307, 309, 311, 313, 315, 317, 319, 321, 323, 325, 327, 329, 331, 333, 335, 337, 339, 341, 343, 345, 347, 349, 351, 353, 355, 357, 359, 361, 363, 365, 367, 369, 371, 373, 375, 377, 379, 381, 383, 385, 386, 388, 390, 392, 394, 396, 398, 400, 402, 404, 406, 408, 410, 412, 414, 416, 418, 420, 422, 424, 426, 428, 430, 432, 434, 436, 438, 440, 442, 444, 446, 448, 450, 452, 454, 456, 458, 460, 462, 464, 466, 468, 470, 472, 474, 476, 478, 480, 482, 484, 486, 488, 490, 492, 494, 496, 498, 500, 502, 504, 506, 508, 510, 512, 514, 516, 518, 520, 522, 524, 526, 528, 530, 532, 534, 536, 538, 540, 542, 544, 546, 548, 550, 552, 554, 556, 558, 560, 562, 564, 566, 568, 570, 572, 574, 576, 578, 580, 582, 584, 586, 588, 590, 592, 594, 596 |
| 4 | 2 | 808 | −805, −804, −802, −800, −798, −796, −794, −792, −790, −788, −786, −784, −782, −780, −778, −776, −774, −772, −770, −768, −766, −764, −762, −760, −758, −756, −754, −752, −750, −748, −746, −744, −742, −740, −738, −736, −734, −732, −730, −728, −726, −724, −722, −720, −718, −716, −714, −712, −710, −708, −706, −704, −702, −700, −698, −696, −694, −692, −690, −688, −686, −684, −682, −680, −678, −676, −674, −672, −670, −668, −666, −664, −662, −660, −658, −656, −654, −652, −650, −648, −646, −644, −642, −640, −638, −636, −634, −632, −630, −628, −626, −624, −622, −620, −618, −616, −614, −612, −610, −608, −606, −604, −602, −600, −598, −596, −594, −592, −590, −588, −586, −584, −582, −580, −578, −576, −574, −572, −570, −568, −566, −564, −562, −560, −558, −556, −554, −552, −550, −548, −546, −544, −542, −540, −538, −536, −534, −532, −530, −528, −526, −524, −522, −520, −518, −516, −514, −512, −510, −508, −506, −504, −502, −500, −498, −496, −494, −492, −490, −488, −486, −484, −482, −480, −478, −476, −474, −472, −470, −468, −466, −464, −462, −460, −458, −456, −454, −452, −450, −448, −446, −444, −442, −440, −438, −436, −434, −432, −430, −428, −426, −424, −422, −420, −418, −416, −414, −412, −410, −408, −406, −404, −402, −400, −398, −396, −394, −392, −390, −388, −386, −385, −383, −381, −379, −377, −375, −373, −371, −369, −367, −365, −363, −361, −359, −357, −355, −353, −351, −349, −347, −345, −343, −341, −339, −337, −335, −333, −331, −329, −327, −325, −323, −321, −319, −317, −315, −313, −311, −309, −307, −305, −303, −301, −299, −297, −295, −293, −291, −289, −287, −285, −283, −281, −279, −277, −275, −273, −271, −269, −267, −265, −263, −261, −259, −257, −255, −253, −251, −249, −247, −245, −243, −241, −239, −237, −235, −233, −231, −229, −227, −225, −223, −221, −219, −217, −215, −213, −211, −209, −207, −205, −203, −201, −199, −197, −195, −193, −191, −189, −187, −185, −183, −181, −179, −177, −176, −174, −172, −170, −168, −166, −164, −162, −160, −158, −156, −154, −152, −150, −148, −146, −144, −142, −140, −138, −136, −134, −132, −130, −128, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 177, 179, 181, 183, 185, 187, 189, 191, 193, 195, 197, 199, 201, 203, 205, 207, 209, 211, 213, 215, 217, 219, 221, 223, 225, 227, 229, 231, 233, 235, 237, 239, 241, 243, 245, 247, 249, 251, 253, 255, 257, 259, 261, 263, 265, 267, 269, 271, 273, 275, 277, 279, 281, 283, 285, 287, 289, 291, 293, 295, 297, 299, 301, 303, 305, 307, 309, 311, 313, 315, 317, 319, 321, 323, 325, 327, 329, 331, 333, 335, 337, 339, 341, 343, 345, 347, 349, 351, 353, 355, 357, 359, 361, 363, 365, 367, 369, 371, 373, 375, 377, 379, 381, 383, 385, 386, 388, 390, 392, 394, 396, 398, 400, 402, 404, 406, 408, 410, 412, 414, 416, 418, 420, 422, 424, 426, 428, 430, 432, 434, 436, 438, 440, 442, 444, 446, 448, 450, 452, 454, 456, 458, 460, 462, 464, 466, 468, 470, 472, 474, 476, 478, 480, 482, 484, 486, 488, 490, 492, 494, 496, 498, 500, 502, 504, 506, 508, 510, 512, 514, 516, 518, 520, 522, 524, 526, 528, 530, 532, 534, 536, 538, 540, 542, 544, 546, 548, 550, 552, 554, 556, 558, 560, 562, 564, 566, 568, 570, 572, 574, 576, 578, 580, 582, 584, 586, 588, 590, 592, 594, 596, 598, 600, 602, 604, 606, 608, 610, 612, 614, 616, 618, 620, 622, 624, 626, 628, 630, 632, 634, 636, 638, 640, 642, 644, 646, 648, 650, 652, 654, 656, 658, 660, 662, 664, 666, 668, 670, 672, 674, 676, 678, 680, 682, 684, 686, 688, 690, 692, 694, 696, 698, 700, 702, 704, 706, 708, 710, 712, 714, 716, 718, 720, 722, 724, 726, 728, 730, 732, 734, 736, 738, 740, 742, 744, 746, 748, 750, 752, 754, 756, 758, 760, 762, 764, 766, 768, 770, 772, 774, 776, 778, 780, 782, 784, 786, 788, 790, 792, 794, 796, 798, 800, 802, 804, 805 |

In Table 4 above, a subcarrier set for a dynamic feedback is a subset of subcarriers defined for Ng=2 with respect to a corresponding channel width, and includes not only subcarriers having an index −2 and an index 2 but also edge subcarriers. In the present specification, during a hybrid beamforming procedure, a compressed beamforming feedback process feeds back channel information with an interval of Ng subcarriers by determining grouping (Ng=2, 4, 8) instead of feeding back all subcarriers. However, an embodiment proposed in the present specification also proposes a dynamic grouping technique. Dynamic grouping is a scheme in which the feedback is performed by flexibly changing a value Ng according to a channel situation without having to perform the feedback with an interval of one fixed value Ng out of 2, 4, and 8 when performing the feedback. For example, if Ng is 2 in the presence of 10 subcarriers in total, subcarriers 1, 3, 5, 7, and 9 are fed back in the conventional scheme, whereas the dynamic grouping is a method of determining a subcarrier in which the feedback is dynamically performed in such a manner that Ng uses 2, 4, and 2 dynamically and thus a subcarrier interval is 2, 4, and 2 such as subcarriers 1, 3, 7, and 9. Thus, a dynamic grouping value may be used among 2, 4, and 8 as the value Ng.

4. Proposed Embodiment 4.1 Problem of the Previously Proposed Method

In case of the previously proposed dynamic grouping, 1, 2, 4, and 8 are used except for an edge tone and tones contiguous to a DC tone, as can be seen in the conventional technique. In this case, 1 which is not determined as a value Ng is used. In addition, tones (edge tone, DC-contiguous tone: −2, 2) required for feedback performance may not be included.

In addition, when a carrier index is fed back as can be seen in Table 3 above, a differential subcarrier index is fed back. In this scheme, which subcarrier will be fed back is not clear in case of a first carrier index. Further, since the total number of subcarriers exceeds 352 in case of 1 CB (single channel) and exceeds 700 in case of 2 CB, 3 bits are not enough to feed back a first subcarrier position. An edge tone has an index of −177 and 177 in case of 1 CB, −386 and 386 in case of 2 CB, −596 and 596 in case of 3 CB, and −805 and 805 in case of 4 CB.

4.2 First Feedback Subcarrier Position 4.2.1) A First Subcarrier Position at which a Feedback Starts is Indicated.

Proposed is a method for indicating how many subcarriers are spaced apart from a left edge subcarrier or a right edge subcarrier at a first carrier index 0 for starting a feedback.

4.2.1.a) Indication Using 3 Bits

How many subcarriers are spaced apart from an edge tone may be indicated (0 to 7 may be used for indication, and if it is 0, an edge tone is a feedback starting tone).

After a first feedback subcarrier position is determined, a subcarrier to be fed back may be dynamically reported by using a predefined value Ng and 1.

4.2.1.b) Indication Using 1 and Predetermined Values Ng with 2 Bits

How far it is spaced apart from an edge tone may be reported by using predetermined values Ng (2, 4, 8) and 1.

00→1, 01→2, 10→4, 11→8

In this manner, 2 bits may be used for indication.

Alternatively, 0 may be used instead of 1.

00→0, 01→2, 10→4, 11→8

After the first feedback subcarrier position is determined, a subcarrier to be fed back may be dynamically reported by using a predefined value Ng and 1.

4.2.2) A First Subcarrier Position for Starting a Feedback is Fixed to a Left or Right Edge Subcarrier.

An additional bit for a starting tone is not necessary.

After the first feedback subcarrier position is determined, a subcarrier to be fed back may be dynamically reported by using a predefined value Ng and 1.

4.3 Feedback Interval

In the conventional technique, a differential carrier index is indicated by using 3 bits.

Proposed is a method in which a carrier index is fed back by using 1 and values Ng 2, 4, and 8.

Assuming that a first feedback carrier index is determined, a second feedback subcarrier is located spaced apart by an interval of 1 or 2 or 4 or 8. That is, an interval (1 or 2 or 4 or 8) between two subcarriers may be indicated by using 2 bits. For example, it is indicated such as 00→1, 01→2, 10→4, 11→8.

4.4 Restriction not to Feed Back DC

Since only an interval between subcarriers can be known when performing dynamic grouping, a feedback subcarrier may include a DC subcarrier (−1, 0, 1) according to a configuration. For this reason, a subcarrier located contiguous to the DC requires a restriction.

4.4.1) Method of Fixing a DC-Adjacent Subcarrier

Subcarriers −2 and 2 are used by being fixed as a feedback subcarrier

Subcarriers −3 and 3 are used by being fixed as a feedback subcarrier

Subcarriers −4 and 4 are used by being fixed as a feedback subcarrier

When an interval is greater than or equal to 8, only values of −2, −3, and −4 are considered due to performance degradation.

4.4.2) Method of Designating a Range

There is a situation where the aforementioned fixed value cannot be used according to the configuration of 1, 2, 4, 8. There is a method of restricting a maximum interval to 8 by designing a range in preparation for this case.

One of subcarriers −2, −3, −4 are fed back, and one of subcarriers 2, 3, 4 are fed back.

The feedback performed by designating the range in this manner has an advantage in that a feedback subcarrier can be flexibly determined when the fixed value cannot be used according to the configuration of 1, 2, 4, 8.

In addition, the feedback subcarrier can be determined without performance degradation since the maximum interval between the subcarriers −2, −3, −4 and the subcarriers 2, 3, 4 is 8.

4.5. Method of Determining a Differential Subcarrier Index

When performing the conventional compressed beamforming feedback in the determining of a dynamic feedback subcarrier index, a subcarrier index in case of Ng=2 is determined as a superset, and left and right edge subcarriers and subcarriers −2 and 2 which are DC-adjacent subcarriers are necessarily included. The reason of starting the feedback from the left or right edge subcarrier is that it is difficult to allocate a position of a bit which is first fed back in a case were the feedback does not start at the edge subcarrier when a difference to a next feedback index is fed back, and the reason of including the DC-adjacent subcarriers −2 and 2 is that a DC tone may be selected as a feedback subcarrier (−1, 0, 1) when a subcarrier interval is dynamically configured.

That is, a first measurement feedback subcarrier is a right or left edge subcarrier.

In this case, information to be fed back is a difference between adjacent subcarriers, and values 2, 4, 8, 16, 32 are considered.

In the above situation, there are cases where the values cannot expressed by 2, 4, 8, 16, 32. Herein, values 64 and 128 may be additionally considered, and values 16 and 32 may be excluded. In addition, these values may be possibly changed to other values.

A case of a single channel (1 CB) is taken for example in the following description.

Example 1) First feedback subcarrier: −177, Second feedback subcarrier: −176, Third feedback subcarrier: −174

In this case, a difference between a first subcarrier and a second subcarrier is 1, but the values considered above cannot express 1.

Example 2) First feedback subcarrier: −177, Second feedback subcarrier: −174, Third feedback subcarrier: −172

In this case, a difference between a first subcarrier and a second subcarrier is 3, but the values considered above cannot express 3.

Example 3) First feedback subcarrier: −177, Second feedback subcarrier: −172, Third feedback subcarrier: −170

In this case, a difference between a first subcarrier and a second subcarrier is 5, but the values considered above cannot express 5.

The above cases cannot be expressed by the considered values 2, 4, 8, 16, 32, and may lead to an overhead since there is a need to allocate an additional bit for these cases.

A method for solving the above problem is proposed.

By using that a subcarrier index in case of Ng=2 is a superset, a subcarrier index to be fed back is expressed by a subcarrier index in case of Ng=2 instead of all subcarriers.

A possible index difference may be set to 1, 2, 4, 8, or 16. In this case, there is an advantage in that the aforementioned problem can be solved in comparison with the conventional method.

The proposed technique may be defined by the following table.

TABLE 5

| Field | | Size (3bit) | | Meaning |
|---|---|---|---|---|
| Carrier index | Differential carrier index [stcidx(1) − stcidx(2)] | 3 bit (value: 000) | Difference between first subcarrier index and second subcarrier index |
| | Differential carrier index [stcidx(2) − stcidx(3)] | 3 bit (value: 001) | Difference between second subcarrier index and third subcarrier index |
| | Differential carrier index [stcidx(3) − stcidx(4)] | 3 bit (value: 011) | Difference between third subcarrier index and fourth subcarrier index |
| | Differential carrier index [stcidx(4) − stcidx(5)] | 3 bit (value: 000) | Difference between fourth subcarrier index and fifth subcarrier index |
| | Differential carrier index [stcidx(Nsc − 1) − stcidx(Nsc)] | 3 | |

For example, all subcarriers are indexed when a feedback is performed starting from a left edge subcarrier in a single channel.

This is expressed such that −177 is #1, −176 is #2, −175 is #3, −174 is #4, etc. In this case, the aforementioned problem occurs.

However, indexing may be performed by determining the case of Ng=2 as a superset.

This may be expressed such that −177 is #1, −176 is #2, −174 is #3, −172 is #4, etc.

Herein, proposed is a method of feeding back an index difference in subcarriers in case of Ng=2.

That is, this is a method of reporting an index difference, that is, how many times to be skipped to select a subcarrier to be fed back, by utilizing that a case of Ng=2 is determined as a superset instead of a substantial subcarrier difference.

Herein, a value 1, 2, 4, 8 or 16 may be considered as possible values.

Examples in which the aforementioned problem occurs may be expressed as follows through the proposed method.

Example 1) First feedback subcarrier: −177, Second feedback subcarrier: −176, Third feedback subcarrier: −174

In this case, a subcarrier number difference of a first subcarrier and a second subcarrier is 1, and an index difference is 1. Therefore, the value 1 is selected.

A subcarrier number difference between the second subcarrier and a third subcarrier is 2, but an index difference is 1. Therefore, the value 1 is selected.

Example 2) First feedback subcarrier: −177, Second feedback subcarrier: −174, Third feedback subcarrier: −172

In this case, a subcarrier number difference between the first subcarrier and the second subcarrier is 3, but an index difference is 2. Therefore, the value 2 is selected.

A subcarrier number difference between the second subcarrier and a third subcarrier is 2, but an index difference is 1. Therefore, the value 1 is selected.

Example 3) First feedback subcarrier: −177, Second feedback subcarrier: −172, Third feedback subcarrier: −170

In this case, a subcarrier number difference between a first subcarrier and a second subcarrier is 5, but an index difference is 2. Therefore, the value 2 is selected.

A subcarrier number difference between the second subcarrier and a third subcarrier is 2, but an index difference is 1. Therefore, the value 1 is selected.

Feedback carrier index scidx( ): compressed beamforming tone index when Ng=2. Differential carrier index: Index difference (1, 2, 4, 8, 16) of feedback carrier, allocated with 3 bits (e.g.) 000→1, 001→2, 010→4, 011→8, 100→16

Example) First feedback subcarrier: −177, Second feedback subcarrier: −176, Third feedback subcarrier: −172, Fourth feedback subcarrier: −164, Fifth feedback subcarrier: −162

Differential carrier index [stcidx(0)-stcidx(1)]

Figure 17:
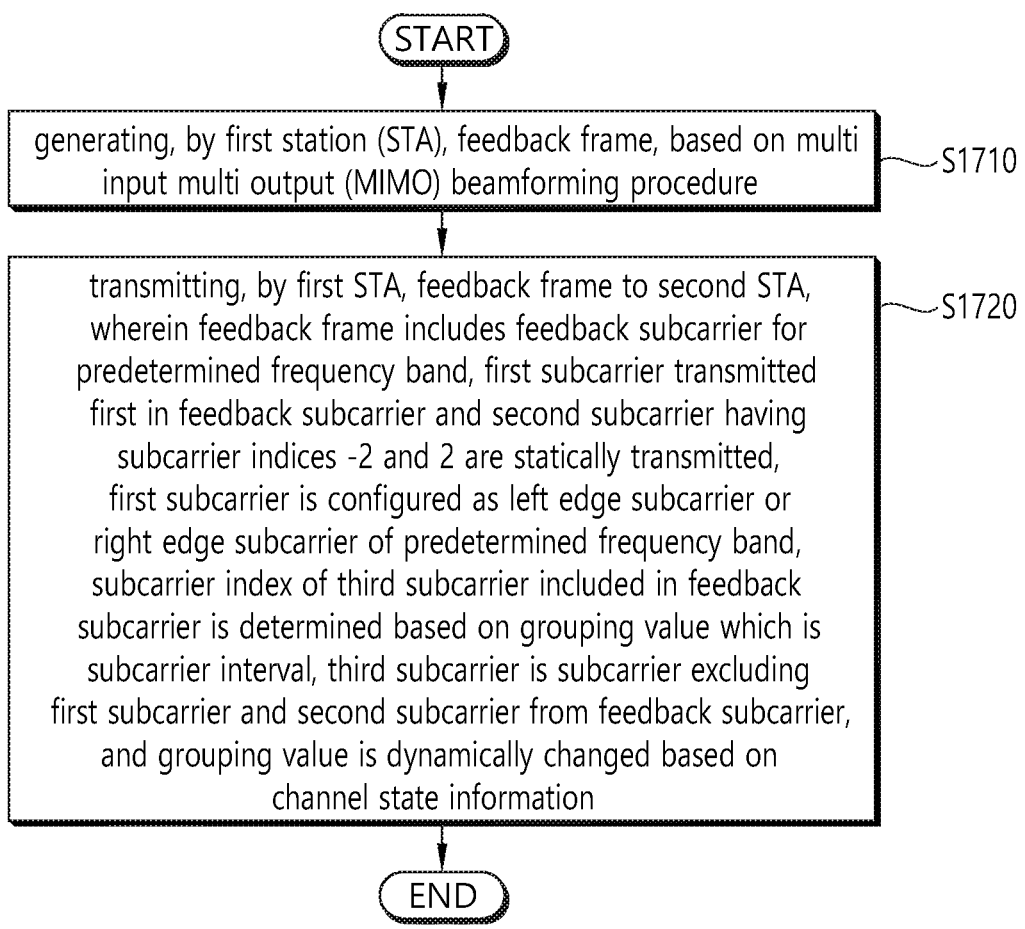
FIG. 17 is a flowchart for transmitting a feedback frame to perform MIMO beamforming according to the present embodiment.

FIG. 17 is a flowchart for transmitting a feedback frame to perform MIMO beamforming according to the present embodiment.

The present embodiment proposes a method in which a feedback carrier is configured with a subcarrier interval corresponding to a grouping value instead of feeding back all subcarriers in a compressed beamforming feedback process during a hybrid beamforming procedure. However, the present embodiment proposes a method in which the grouping value is not fixed but flexibly changed according to a channel situation to dynamically transmit a feedback subcarrier.

First, summarizing terminologies, a first STA may correspond to a responder for performing MIMO beamforming, and a second STA may correspond to an initiator for performing MIMO beamforming. The MIMO beamforming described in the present embodiment may correspond to single user (SU)-MIMO beamforming if the first STA is a single device, and may correspond to multi user (MU)-MIMO beamforming if the first STA is a plurality of devices.

In step S1710, the first STA generates a feedback frame based on a multi input multi output (MIMO) beamforming procedure. The MIMO beamforming procedure may include a sounding procedure for transmitting/receiving a BRP (Beam Refinement Protocol or Beam Refinement Phase) packet (or frame).

In step S1720, the feedback frame is transmitted to the second STA.

The feedback frame may be defined as follows.

The feedback frame includes a feedback subcarrier for a predetermined frequency band.

A first subcarrier transmitted first in the feedback subcarrier and a second subcarrier having subcarrier indices −2 and 2 are statically transmitted. The first subcarrier is configured as a left edge subcarrier or right edge subcarrier of the predetermined frequency band.

A subcarrier index of a third subcarrier included in the feedback subcarrier is determined based on a grouping value which is a subcarrier interval. The third subcarrier is a subcarrier excluding the first subcarrier and the second subcarrier from the feedback subcarrier. The grouping value is dynamically changed based on channel state information.

That is, since the grouping value is dynamically changed according to a channel state, the third subcarrier included in the feedback subcarrier may be dynamically transmitted instead of being transmitted at a static position. However, the first subcarrier and second subcarrier included in the feedback subcarrier may always be transmitted statically.

The grouping value may be an interval between subcarriers contiguous to the third subcarrier. The grouping value may be determined as one of values 2, 4, and 8. The grouping value may be indicated with 2 bits.

The third subcarrier may be determined as a subcarrier spaced apart by the grouping value or 1 sequentially from the first subcarrier.

For example, it is assumed that a subcarrier index of the first subcarrier is −177. A subcarrier transmitted secondly in the feedback subcarrier may be spaced apart by 1 from the first subcarrier, and thus a subcarrier index thereof may be −176. A subcarrier transmitted thirdly in the feedback subcarrier may be spaced apart by the grouping value (assuming that Ng=4) from the subcarrier transmitted secondly, and thus a subcarrier index thereof may be −172. That is, the grouping value (assuming that Ng=4) may indicate an interval between the subcarrier transmitted secondly and the subcarrier (adjacent subcarrier) transmitted thirdly. The grouping value is indicated with 2 bits (The grouping value includes information on 2 bits), and may be indicated such as Ng=2 if 01, Ng=4 if 10, and Ng=8 if 11.

The predetermined frequency band may be determined according to channel bonding supported in 802.11ay.

For example, if the predetermined frequency band corresponds to (is related with) a single channel, a subcarrier index of the left edge subcarrier may be −177, and a subcarrier index of the right edge subcarrier may be 177.

For another example, if the predetermined frequency band corresponds to (is related with) two bonded channels, the subcarrier index of the left edge subcarrier may be −386, and the subcarrier index of the right edge subcarrier may be 386.

For another example, if the predetermined frequency band corresponds to (is related with) three bonded channels, the subcarrier index of the left edge subcarrier may be −596, and the subcarrier index of the right edge subcarrier may be 596.

For another example, if the predetermined frequency band corresponds to (is related with) four bonded channels, the subcarrier index of the left edge subcarrier may be −805, and the subcarrier index of the right edge subcarrier may be 805.

The channel state information may be transmitted through the feedback subcarrier.

A fourth subcarrier having subcarrier indices −1, 0, and 1 is not transmitted in the feedback subcarrier. The fourth subcarrier may be a DC subcarrier. Transmitting of the second subcarrier having the subcarrier indices −2 and 2 may be a limitation for not feeding back the DC subcarrier.

Figure 18:
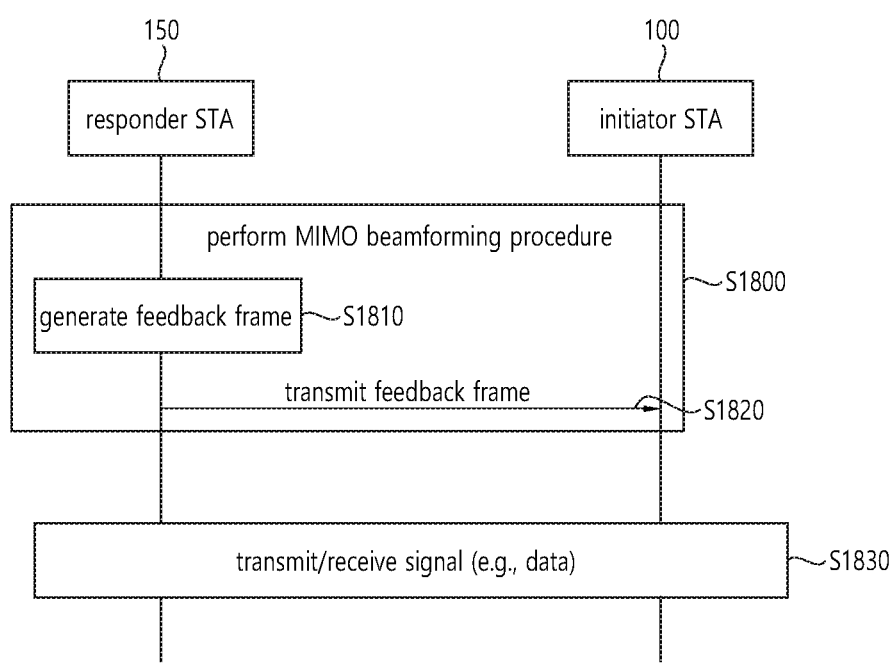
FIG. 18 shows a procedure of transmitting a feedback frame to perform MIMO beamforming according to the present embodiment.

FIG. 18 shows a procedure of transmitting a feedback frame to perform MIMO beamforming according to the present embodiment.

First, summarizing terminologies, a first STA may correspond to a responder 150 for performing MIMO beamforming, and a second STA may correspond to an initiator 100 for performing MIMO beamforming. The MIMO beamforming described in the present embodiment may correspond to single user (SU)-MIMO beamforming if the first STA is a single device, and may correspond to multi user (MU)-MIMO beamforming if the first STA is a plurality of devices.

In step S1800, the first STA performs a MIMO beamforming procedure together with the second STA. The MIMO beamforming procedure may include steps S1810 and S1820.

In step S1810, the first STA generates a feedback frame based on a multi input multi output (MIMO) beamforming procedure. The MIMO beamforming procedure may include a sounding procedure for transmitting/receiving a BRP (Beam Refinement Protocol or Beam Refinement Phase) packet (or frame).

In step S1820, the first STA transmits the feedback frame to the second STA.

In step S1830, the first STA transmits/receives a signal based on the MIMO beamforming procedure.

The feedback frame may be defined as follows.

The feedback frame includes a feedback subcarrier for a predetermined frequency band.

A first subcarrier transmitted first in the feedback subcarrier and a second subcarrier having subcarrier indices −2 and 2 are statically transmitted. The first subcarrier is configured as a left edge subcarrier or right edge subcarrier of the predetermined frequency band.

A subcarrier index of a third subcarrier included in the feedback subcarrier is determined based on a grouping value which is a subcarrier interval. The third subcarrier is a subcarrier excluding the first subcarrier and the second subcarrier from the feedback subcarrier. The grouping value is dynamically changed based on channel state information.

That is, since the grouping value is dynamically changed according to a channel state, the third subcarrier included in the feedback subcarrier may be dynamically transmitted instead of being transmitted at a static position. However, the first subcarrier and second subcarrier included in the feedback subcarrier may always be transmitted statically.

The grouping value may be an interval between subcarriers contiguous to the third subcarrier. The grouping value may be determined as one of values 2, 4, and 8. The grouping value may be indicated with 2 bits.

The third subcarrier may be determined as a subcarrier spaced apart by the grouping value or 1 sequentially from the first subcarrier.

For example, it is assumed that a subcarrier index of the first subcarrier is −177. A subcarrier transmitted secondly in the feedback subcarrier may be spaced apart by 1 from the first subcarrier, and thus a subcarrier index thereof may be −176. A subcarrier transmitted thirdly in the feedback subcarrier may be spaced apart by the grouping value (assuming that Ng=4) from the subcarrier transmitted secondly, and thus a subcarrier index thereof may be −172. That is, the grouping value (assuming that Ng=4) may indicate an interval between the subcarrier transmitted secondly and the subcarrier (adjacent subcarrier) transmitted thirdly. The grouping value is indicated with 2 bits (The grouping value includes information on 2 bits), and may be indicated such as Ng=2 if 01, Ng=4 if 10, and Ng=8 if 11.

The predetermined frequency band may be determined according to channel bonding supported in 802.11ay.

For example, if the predetermined frequency band corresponds to (is related with) a single channel, a subcarrier index of the left edge subcarrier may be −177, and a subcarrier index of the right edge subcarrier may be 177.

For another example, if the predetermined frequency band corresponds to (is related with) two bonded channels, the subcarrier index of the left edge subcarrier may be −386, and the subcarrier index of the right edge subcarrier may be 386.

For another example, if the predetermined frequency band corresponds to (is related with) three bonded channels, the subcarrier index of the left edge subcarrier may be −596, and the subcarrier index of the right edge subcarrier may be 596.

For another example, if the predetermined frequency band corresponds to (is related with) four bonded channels, the subcarrier index of the left edge subcarrier may be −805, and the subcarrier index of the right edge subcarrier may be 805.

The channel state information may be transmitted through the feedback subcarrier.

A fourth subcarrier having subcarrier indices −1, 0, and 1 is not transmitted in the feedback subcarrier. The fourth subcarrier may be a DC subcarrier. Transmitting of the second subcarrier having the subcarrier indices −2 and 2 may be a limitation for not feeding back the DC subcarrier.

5. Device Configuration

Figure 19:
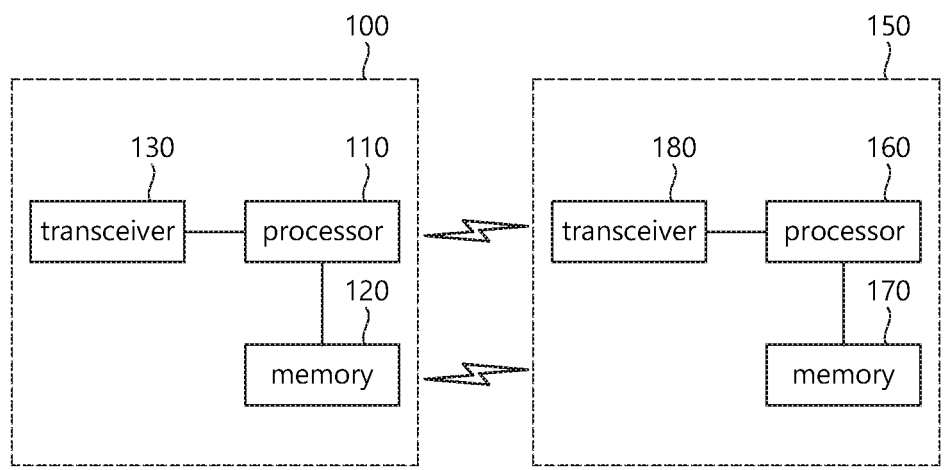
FIG. 19 is a diagram showing a device for implementing the above-described method.

FIG. 19 is a diagram describing a device for implementing the above-described method.

A wireless device (100) of FIG. 19 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement functions, processes, and/or methods proposed in the present specification. For example, the processor (110, 160) may perform the aforementioned operation according to the present embodiment.

The processor (110) of the transmitting device operates as follows. The processor (110) of the transmitting device generates a feedback frame based on a multi input multi output (MIMO) beamforming procedure, and transmits the feedback frame.

The processor (160) of the receiving device operates as follows. The processor (160) of the receiving device receives a feedback frame generated in the transmitting device.

The feedback frame may be defined as follows.

The feedback frame includes a feedback subcarrier for a predetermined frequency band.

A first subcarrier transmitted first in the feedback subcarrier and a second subcarrier having subcarrier indices −2 and 2 are statically transmitted. The first subcarrier is configured as a left edge subcarrier or right edge subcarrier of the predetermined frequency band.

A subcarrier index of a third subcarrier included in the feedback subcarrier is determined based on a grouping value which is a subcarrier interval. The third subcarrier is a subcarrier excluding the first subcarrier and the second subcarrier from the feedback subcarrier. The grouping value is dynamically changed based on channel state information.

That is, since the grouping value is dynamically changed according to a channel state, the third subcarrier included in the feedback subcarrier may be dynamically transmitted instead of being transmitted at a static position. However, the first subcarrier and second subcarrier included in the feedback subcarrier may always be transmitted statically.

The grouping value may be an interval between subcarriers contiguous to the third subcarrier. The grouping value may be determined as one of values 2, 4, and 8. The grouping value may be indicated with 2 bits.

The third subcarrier may be determined as a subcarrier spaced apart by the grouping value or 1 sequentially from the first subcarrier.

For example, it is assumed that a subcarrier index of the first subcarrier is −177. A subcarrier transmitted secondly in the feedback subcarrier may be spaced apart by 1 from the first subcarrier, and thus a subcarrier index thereof may be −176. A subcarrier transmitted thirdly in the feedback subcarrier may be spaced apart by the grouping value (assuming that Ng=4) from the subcarrier transmitted secondly, and thus a subcarrier index thereof may be −172. That is, the grouping value (assuming that Ng=4) may indicate an interval between the subcarrier transmitted secondly and the subcarrier (adjacent subcarrier) transmitted thirdly. The grouping value is indicated with 2 bits (The grouping value includes information on 2 bits), and may be indicated such as Ng=2 if 01, Ng=4 if 10, and Ng=8 if 11.

The predetermined frequency band may be determined according to channel bonding supported in 802.11ay.

For example, if the predetermined frequency band corresponds to (is related with) a single channel, a subcarrier index of the left edge subcarrier may be −177, and a subcarrier index of the right edge subcarrier may be 177.

For another example, if the predetermined frequency band corresponds to (is related with) two bonded channels, the subcarrier index of the left edge subcarrier may be −386, and the subcarrier index of the right edge subcarrier may be 386.

For another example, if the predetermined frequency band corresponds to (is related with) three bonded channels, the subcarrier index of the left edge subcarrier may be −596, and the subcarrier index of the right edge subcarrier may be 596.

For another example, if the predetermined frequency band corresponds to (is related with) four bonded channels, the subcarrier index of the left edge subcarrier may be −805, and the subcarrier index of the right edge subcarrier may be 805.

The channel state information may be transmitted through the feedback subcarrier.

A fourth subcarrier having subcarrier indices −1, 0, and 1 is not transmitted in the feedback subcarrier. The fourth subcarrier may be a DC subcarrier. Transmitting of the second subcarrier having the subcarrier indices −2 and 2 may be a limitation for not feeding back the DC subcarrier.

What is claimed is:

1. A method of transmitting a feedback frame in a wireless local area network (WLAN) system, the method comprising:
    generating, by a first station (STA), the feedback frame based on a multi input multi output (MIMO) beamforming procedure; and
    transmitting, by the first STA, the feedback frame to a second STA,
    wherein the feedback frame includes information on a feedback subcarrier for a predetermined frequency band,
    wherein the feedback subcarrier includes a first subcarrier, second subcarriers, and third subcarriers,
    wherein the first subcarrier is configured as a left edge subcarrier or right edge subcarrier of the predetermined frequency band,
    wherein the second subcarriers are subcarriers whose subcarrier indices are −2 and 2,
    wherein the third subcarriers are remaining subcarriers excluding the first subcarrier and the second subcarriers,
    wherein the first subcarrier and the second subcarriers are statically transmitted,
    wherein each distance between the third subcarriers within the feedback frame is dynamically determined by a grouping value, and
    wherein the grouping value for the third subcarriers are flexibly changed to 2, 4, or 8 based on channel state information.

2. The method of claim 1,
    wherein the grouping value is an interval between subcarriers contiguous to the third subcarrier, and
    wherein the grouping value is indicated with 2 bits.

3. The method of claim 1, wherein the third subcarrier is determined as a subcarrier spaced apart by the grouping value or 1 sequentially from the first subcarrier.

4. The method of claim 1, wherein if the predetermined frequency band is related with a single channel, a subcarrier index of the left edge subcarrier is −177, and a subcarrier index of the right edge subcarrier is 177.

5. The method of claim 1, wherein if the predetermined frequency band is related with two bonded channels, a subcarrier index of the left edge subcarrier is −386, and a subcarrier index of the right edge subcarrier is 386.

6. The method of claim 1, wherein if the predetermined frequency band is related with three bonded channels, a subcarrier index of the left edge subcarrier is −596, and a subcarrier index of the right edge subcarrier is 596.

7. The method of claim 1, wherein if the predetermined frequency band is related with four bonded channels, a subcarrier index of the left edge subcarrier is −805, and a subcarrier index of the right edge subcarrier is 805.

8. The method of claim 1, wherein the channel state information is transmitted through the feedback subcarrier.

9. The method of claim 1, wherein a fourth subcarrier having subcarrier indices −1, 0, and 1 is not transmitted in the feedback subcarrier.

10. A station (STA) device for transmitting a feedback frame in a wireless local area network (WLAN) system, the STA device comprising:
    a transceiver having one or more radio frequency (RF) chains and configured to transmit/receive a signal with a different STA device; and
    a processor coupled to the transceiver to process a signal transmitted/received with the different STA device,
    wherein the processor is configured to:
    generate a feedback frame based on a multi input multi output (MIMO) beamforming procedure, and transmits the feedback frame; and
    transmit the feedback frame to the different STA,
    wherein the feedback frame includes information on a feedback subcarrier for a predetermined frequency band,
    wherein the feedback subcarrier includes a first subcarrier, second subcarriers, and third subcarriers,
    wherein the first subcarrier is configured as a left edge subcarrier or right edge subcarrier of the predetermined frequency band,
    wherein the second subcarriers are subcarriers whose subcarrier indices are −2 and 2,
    wherein the third subcarriers are remaining subcarriers excluding the first subcarrier and the second subcarriers,
    wherein the first subcarrier and the second subcarriers are statically transmitted,
    wherein each distance between the third subcarriers within the feedback frame is dynamically determined by a grouping value, and
    wherein the grouping value for the third subcarriers are flexibly changed to 2, 4, or 8 based on channel state information.

11. The STA device of claim 10,
    wherein the grouping value is an interval between subcarriers contiguous to the third subcarrier, and
    wherein the grouping value is indicated with 2 bits.

12. The STA device of claim 10, wherein the third subcarrier is determined as a subcarrier spaced apart by the grouping value or 1 sequentially from the first subcarrier.

13. The STA device of claim 10, wherein if the predetermined frequency band is related with a single channel, a subcarrier index of the left edge subcarrier is −177, and a subcarrier index of the right edge subcarrier is 177.

14. The STA device of claim 10, wherein if the predetermined frequency band is related with two bonded channels, a subcarrier index of the left edge subcarrier is −386, and a subcarrier index of the right edge subcarrier is 386.

15. The STA device of claim 10, wherein if the predetermined frequency band is related with three bonded channels, a subcarrier index of the left edge subcarrier is −596, and a subcarrier index of the right edge subcarrier is 596.

* * * * *